Oct. 30, 1923.
F. J. OVEN
GASKET
Filed July 21, 1921  2 Sheets-Sheet 1
1,472,133
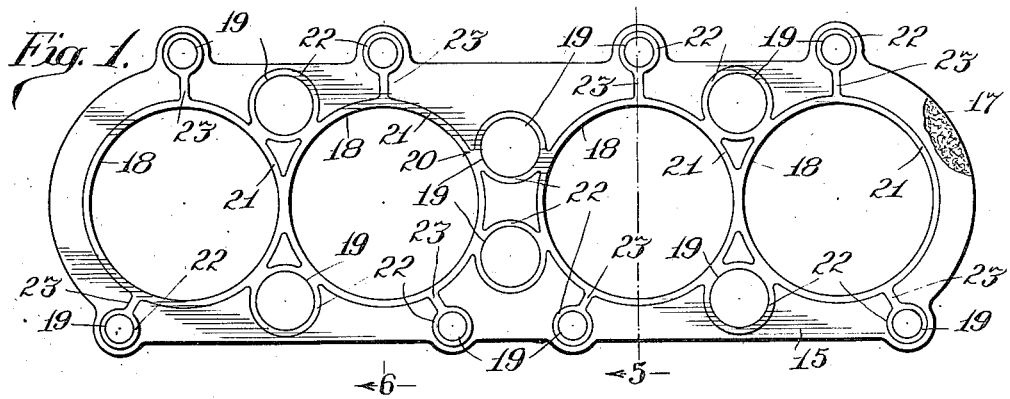
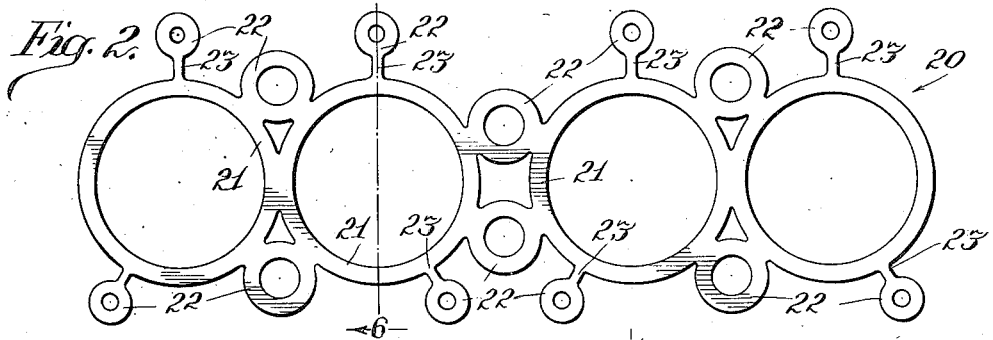
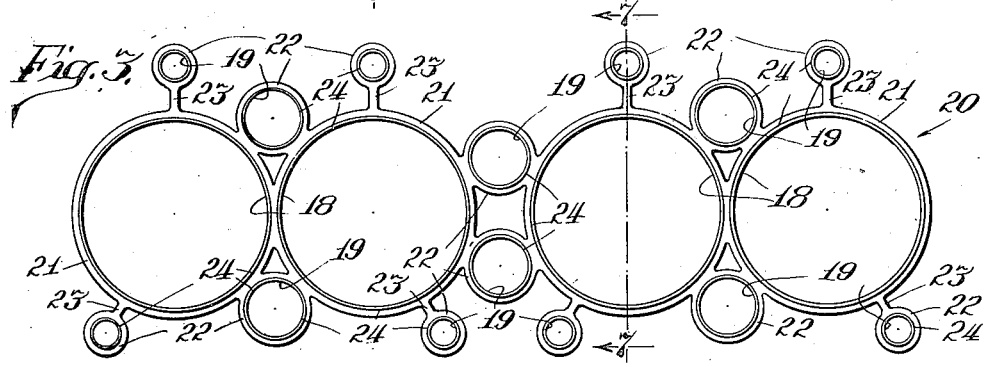
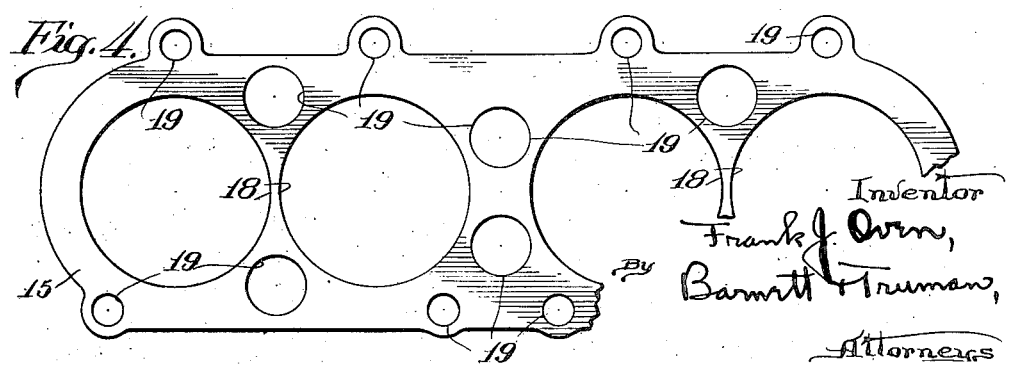

Oct. 30, 1923.

F. J. OVEN

GASKET

Filed July 21, 1921    2 Sheets-Sheet 2

1,472,133

Inventor
Frank J. Oven,
By Barrett Truman,
Attorneys

Patented Oct. 30, 1923.

1,472,133

UNITED STATES PATENT OFFICE.

FRANK J. OVEN, OF CHICAGO, ILLINOIS, ASSIGNOR TO VICTOR MANUFACTURING & GASKET CO., OF CHICAGO, ILLINOIS, A CORPORATION OF ILLINOIS.

GASKET.

Application filed July 21, 1921. Serial No. 486,327.

*To all whom it may concern:*

Be it known that I, FRANK J. OVEN, a citizen of the United States, residing at Chicago, in the county of Cook and State of Illinois, have invented certain new and useful Improvements in Gaskets, of which the following is a specification.

My invention relates to gaskets and particularly to gaskets of a comparatively large size, such as those employed for sealing the joint between the body and the removable head of the cylinder block of an internal combustion engine of this type. The invention has for its principal object the provision of an improved form of gasket of this general class which will have the stability required for handling and shipment without danger of being damaged under ordinary conditions, and which, at the same time, will have the pliancy and resiliency and the sealing qualities required for effective use.

It is another object of my invention to provide a form of gasket which can be produced by a very few steps or operations for forming and assembling and which, accordingly, may be produced at a minimum cost. To these ends, it is the purpose of my invention to provide a gasket comprising a filler sheet of compressible material between two resilient facing members which are held in position as desired, on opposite faces of the filler sheet, by means quickly applied and easily secured in operative holding position.

It is an another object of my invention to improve devices of this type in sundry details hereinafter pointed out. The preferred means by which I have accomplished my several objects are illustrated in the drawings, and are hereinafter specifically described. That which I believe to be new and desire to cover by this application is set forth in the claims.

In the drawings—

Fig. 1 is a face view of one embodiment of my improved gasket construction.

Fig. 2 is an inner face view of the skeleton blank comprising a plurality of conjoined rings, which blank in its completed form constitutes the member by which the facing sheets are held in position.

Fig. 3 is a view of the member shown in Fig. 2, but with the inner edge portion of each of the rings pressed into the form of a flange substantially at right angles to the face of the member.

Fig. 4 is a face view of one of the facing members, partly broken away.

Figure 5:
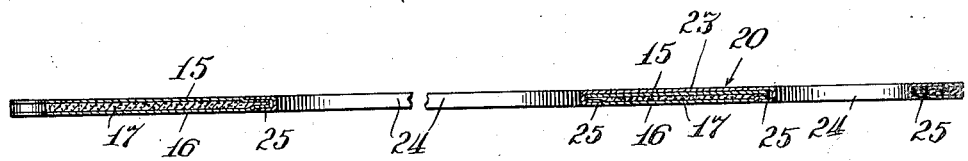
Figure 6:
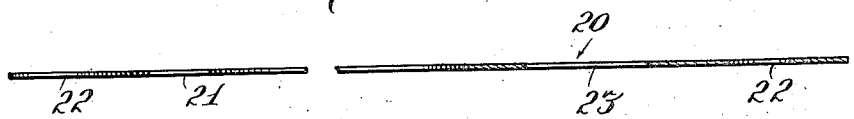
Figure 7:
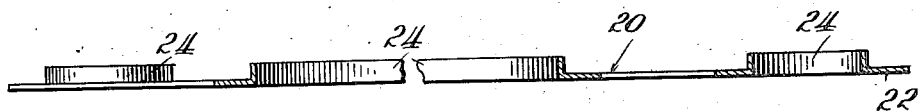

Figs. 5, 6 and 7 are detailed cross-sectional views on an enlarged scale, taken substantially on lines 5—5, 6—6 and 7—7 of Figs. 1, 2 and 3, respectively, and being partly broken away.

Figure 8:
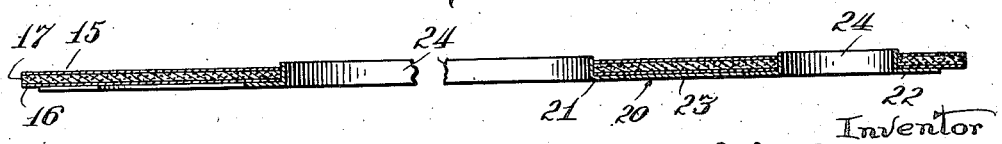

Fig. 8 is a view similar to Fig. 7, but showing the several parts of the gasket in position with respect to each other, ready for the final operation by which the flanges of the several rings of the holding member are turned down flat upon the outer face of the facing member into operative holding position.

Referring now to the several figures of the drawings, in which corresponding parts are indicated by the same reference characters, 15 and 16 indicate the facing members of my improved gasket, being formed in the construction shown by stamping from a thin sheet of metal, preferably copper, having a considerable degree of pliancy and resiliency. One of these facing members is shown in Fig. 4 in the form ready for assembly in a gasket.

As is shown in Fig. 5, a filler sheet 17 of compressible heat resisting material is interposed between the facing members 15 and 16, such filler sheet being cut to a size and shape to conform to the outline of the facing members 15 and 16. This filler sheet 17 is preferably made of asbestos, but any other appropriate form of filler may, of course, be used.

As will be seen from an inspection of Fig. 1, the gasket illustrated in the drawings is formed with large openings 18 corresponding to the bores of a cylinder block, and with other openings 19 corresponding to the water jacket openings and the bolt holes, the latter being shown formed through ears projecting beyond the main body portion of the gasket. It will be understood that the size and the shape of the gasket, and the number of openings therethrough, and the size and relative positions of such openings, will be governed by the contours and construction of the parts between which the gasket is to be placed. It will, accordingly, be appreciated that I do not limit myself to the details of the construction illustrated, except in so far as certain of such details are specifically claimed.

As is best shown in Figs. 1 and 5, the filler sheet and facing members are held in assembled position with respect to each other by a skeleton binder or beading member 20 which is preferably cut or stamped from a sheet of metal of comparatively greater thickness than that of the sheets 15 and 16. This binder comprises a plurality of rings 21 which bind the margins of the openings 18, and a plurality of smaller rings 22 which bind the margins of the openings 19, as hereinafter described forming beads which thicken the edges around the openings on both sides of the body of the gasket. These rings are formed integrally with each other, tongues 23 of appropriate size and length being provided between adjacent ring portions where necessary for insuring the several rings being positioned precisely as necessary for cooperation with the facing members and the filler sheet of the particular gasket. The production of the binder comprises cutting of stamping a blank in skeleton form comprising the several rings and the supporting tongues 23 as may be necessary, such blanks being formed preferably from a sheet of annealed copper, a blank at this stage of preparation being shown in Figs. 2 and 6. The inner marginal portions of the several rings are then pressed into the form of flanges substantially at right angles to the face of the blank, as indicated by Figs. 3 and 7, the flanges being indicated by the numeral 24. The blank is then ready for the final operation of assembling in operative position for holding the remaining parts of the completed gasket in position.

With the binder 20 in the form shown in Fig. 7, the assembly and completion of the gasket is a very simple operation. The facing members 15 and 16 are placed in position on the part 20 with the filler sheet 17 interposed (see Fig. 8), the position of the parts being controlled by the flanges 24 which extend through the openings 18 and 19. The gasket is then completed by the operation of pressing the outer end portions of the flanges 24 into position flat upon the outer face of the facing member 16 in the form of a flange 25, as indicated in Fig. 5. By the use of my improved construction in which the several binding rings are formed integrally with each other, I am enabled to assemble and complete the gaskets with a minimum expenditure of time and labor. As will be readily appreciated, by making the parts integrally, a single operation suffices for forming all the rings, and a second operation produces all the flanges. In this way, in a gasket comprising from ten to twenty rings, a great deal of labor and time are saved. And even more time is saved in the assembling operation, since all the rings are held always in proper relative positions.

By making the binder in skeleton form, I am enabled to secure the desired result with the use of the minimum amount of metal. By making the binder in a separate piece independently of the facing members of the gasket, I am enabled to provide facing members 15 and 16 of the desired thinness and resiliency, it being unnecessary in such case to make either of the facing members of the added thickness desired for the binder, nor to anneal such facing member for the sake of the several flanging operations. By making the facing members very thin and resilient, as distinguished from the heavier annealed binder, such facing members are adapted much more readily to accommodate themselves to the inequalities of the faces between which the gasket is used, rendering the gasket correspondingly more efficient in use. By providing a plurality of thicknesses of metal parts on each face of the filler sheet 17 about the openings therethrough, I have secured the required stability at these points for attaining very satisfactory results, the gaskets made as illustrated in the drawings having proven very efficient in use. Certain types of internal combustion engines having removable heads or cover plates require gaskets which are beaded around their openings on both faces of the gasket in order that a proper and efficient seal be obtained between the cylinder block and head. It has been customary, in the manufacture of gaskets for engines of this sort, to bead or bind the openings by separate rings. My invention provides a gasket for engines such as these which can be made at a much reduced cost and which, for the reasons above stated, and because the beading is effected more uniformly, is a better article than the old type having the separate beading or beading rings.

While I have described the holding member 20 as being of considerably greater thickness than the facing members 15 and 16, it will be understood that I do not wish to limit myself to this and other similar details, except as hereinafter specifically claimed.

I claim:

1. A gasket composed of a body formed with a plurality of openings therethrough, and a binder consisting of a plurality of rings united in a skeleton structure, the rings extending through the openings in the body of the gasket and flanged upon both faces of the same.

2. A gasket having a plurality of openings therethrough and formed of a sheet of compressible material, facing members on opposite sides of said sheet, and a binder consisting of a plurality of rings united in a skeleton structure, the rings extending through the aforesaid openings and being flanged upon said facing members.

3. A gasket having a plurality of openings therethrough and formed of a sheet of asbestos, thin sheets of metal on opposite sides of said asbestos sheet, and a metallic binder consisting of a plurality of rings united in a skeleton structure, the rings extending through said openings and being flanged upon both faces of the gasket.

4. A gasket composed of a body having a plurality of openings, and a sheet metal binder consisting of rings projecting through said openings, joined together integrally in a skeleton structure and flanged on opposite faces of said body.

5. A gasket having a plurality of openings therethrough composed of a sheet of compressible material, sheet metal facing members on opposite sides of said compressible sheet, and a sheet metal binder consisting of rings projecting through said openings, joined together integrally in a skeleton structure and flanged upon said metal facing members.

6. A gasket having a plurality of openings therethrough composed of a sheet of compressible material, thin sheet metal facing members on opposite sides of said compressible sheet, and a binder of annealed sheet metal thicker than the facing members, consisting of a plurality of rings projecting through said openings, joined together integrally in a skeleton structure, and flanged upon both said facing members.

7. A gasket having a plurality of openings therethrough composed of a body of asbestos, thin copper facing sheets on opposite sides of said asbestos body, and a sheet copper binder of thicker material than the facing sheets, consisting of a plurality of rings extending through said openings and flanged upon both facing sheets.

FRANK J. OVEN.